US 6,615,869 B2

(12) United States Patent
Sudani et al.

(10) Patent No.: US 6,615,869 B2
(45) Date of Patent: Sep. 9, 2003

(54) SOLENOID VALVE (75) Inventors: Yuzuru Sudani, Hekinan (JP); Taku Itoh, Chita-gun (JP); Haruhiko Uno, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/103,911

(22) Filed: Mar. 25, 2002

(65) Prior Publication Data

US 2002/0134443 A1 Sep. 26, 2002

(30) Foreign Application Priority Data

Mar. 26, 2001 (JP) ........................................ 2001-088694

(51) Int. Cl.⁷ ............................................. F15B 13/043

(52) U.S. Cl. ............................ 137/625.61; 137/625.64; 251/35

(58) Field of Search ..................... 137/625.61, 625.64; 251/35

(56) References Cited

U.S. PATENT DOCUMENTS 5,031,663 A * 7/1991 Fukuta et al. .......... 137/625.61
5,836,335 A * 11/1998 Harms et al. .......... 137/625.61

FOREIGN PATENT DOCUMENTS

JP 10-213239 8/1998

* cited by examiner

Primary Examiner—Gerald A. Michalsky
(74) Attorney, Agent, or Firm—Nixon & Vanderhye P.C.

(57) ABSTRACT

A solenoid valve has a solenoid, a control valve having a spool, a seat member having an oil hole whose one end communicates with a control pressure chamber between the seat member and the spool, a supply passage through which a second supply port communicates via a control orifice with the control pressure chamber and a drain passage through which the other end of the oil hole is able to communicate with the second drain port. A second orifice or a slit, whose cross sectional opening area is smaller than that of the control orifice, is formed in the supply passage at a periphery of the seat member that comes in contact with the spool so that a flow amount of the oil supplied to and ejected from the control pressure chamber through the supply and drain passages after the spool contacts the seat member is smaller than that before the spool contacts the seat member.

5 Claims, 10 Drawing Sheets

SOLENOID VALVE

CROSS REFERENCE TO RELATED APPLICATION

This application is based upon and claims the benefit of priority of Japanese Patent Application No. 2001-88694 filed on Mar. 26, 2001, the content of which is incorporated herein by reference.

BACKGROUND OF THE INVENTION

1. Field of the Invention

The present invention relates to a solenoid valve in which pressure of a control pressure chamber provided between a spool and a solenoid is controlled to change over a communication between a first supply port and an output port to a communication between the output port and a first drain port by oil supplied from a second supply port to the control pressure chamber and ejected therefrom to a second drain port in cooperation with the solenoid.

2. Description of Related Art

Recently, a hydraulic circuit of an automatic transmission for a vehicle has a two ports-current proportion solenoid valve (so called a bleed type-current proportion solenoid valve) in which oil pressure of a control pressure chamber between a control orifice and a seat member is adjusted by controlling a flow amount of oil to be ejected from the seat member.

The conventional solenoid valve has a stator core and a moving core slidably movable along the stator core upon energizing a coil. The moving core is provided at an axial end thereof with a bleed valve body that is normally in contact with a bleed valve seat of the seat member. When the coil is energized, the moving core moves so that the bleed valve body is away from the bleed valve seat and a bleed hole is opened. Accordingly, the oil of the control pressure chamber is ejected through the bleed hole to a drain so that the oil pressure of the control pressure chamber is reduced.

However, according to the conventional solenoid valve, when the bleed hole of the seat member is opened to reduce the pressure in the control pressure chamber, a flow amount of oil to be ejected from a drain port is large and the large flow amount thereof continues until the bleed hole is closed again, which gives a heavy burden on a hydraulic pump for supplying the oil to the control pressure chamber so that fuel consumption is worse.

To cope with this disadvantage, there has been proposed a solenoid valve in which a diameter of the control orifice is smaller so that a less flow amount of oil is ejected or leaked from the drain port when the bleed hole of the seat member is fully opened.

However, the smaller diameter of the control orifice has a disadvantage that, at low temperature, the oil can not flow smoothly and a hydraulic response characteristic is deteriorated thereby.

SUMMARY OF THE INVENTION

An object of the invention is to provide a solenoid valve in which pressure of a control pressure chamber can be swiftly reduced and, after reducing the pressure to a target pressure, a flow amount of oil to be ejected or leaked from a drain port is small.

It is an aspect of the present invention that the solenoid valve is manufactured at less cost.

To achieve the above object, in a solenoid valve having a hollow sleeve and a spool slidably moving in the hollow sleeve, a seat member fixed to the hollow sleeve has an oil hole whose one end communicates with a control pressure chamber formed in the hollow sleeve between the seat member and the spool. A supply passage through which a second supply port communicates via a first control orifice with the control pressure chamber and a drain passage through which the other end of the oil hole is able to communicate with the second drain port are provided therein. A solenoid has an armature core movable according to an electromagnetic attracting force. The spool is moved in a direction away from the seat member by pressure increase of the control pressure chamber due to oil supplied thereto via the supply passage, when the armature core is in contact with the seat member and closes the other end of the oil hole, and moved toward the seat member by pressure decrease of the control pressure chamber due to the oil ejected therefrom via the drain passage, when the armature core is away from the seat member and opens the other end of the oil hole, so that a communication between a first supply port and an output port is changed over to a communication between the output port and a first drain port and vice versa.

In the solenoid valve mentioned above, a second control orifice, whose cross sectional opening area is smaller than that of the first control orifice, is formed in the supply passage when an end of the spool comes in contact with an end of the seat member so that a flow amount of the oil supplied to and ejected from the control pressure chamber through the supply and drain passages after the spool contacts the seat member is smaller than that before the spool contacts the seat member.

According to the solenoid valve mentioned above, once the spool comes in contact with the seat member, the flow amount of oil supplied to and ejected from the control pressure chamber is small due to the second control orifice, which serves to improve a fuel consumption of a vehicle, for example, if applied to an automatic transmission.

It is preferable that the second control orifice is a slit or an aperture formed at a periphery of at least one of the end of the seat member and the end of the spool that come in contact with each other so as to sandwich the control pressure chamber therebetween so that one end of the slit communicates with the control pressure chamber and the other end thereof communicates with the first control orifice. This construction is more beneficial when the first control orifice is located in a vicinity of a portion where the seat member contacts the spool since the second control orifice can communicate with the first control orifice with a shorter distance.

Further, since the slit or aperture is simple in construction, the solenoid valve can be manufactured at less cost.

If the first control orifice is located away from the portion where the seat member contacts the spool, the supply passage may have an oil conduit formed in the spool, whose one end communicates with the first control orifice and whose the other end communicates with the control pressure chamber and, further, the seat member may be composed of a first seat member, positioned on a side of the solenoid, having the oil hole and a second seat member, positioned on a side of the spool, protruding into the control pressure chamber and having a slit constituting the second control orifice through which the other end of the oil conduit is opened to the control pressure chamber, when the spool comes in contact with the second seat member so as to sandwich the control pressure chamber between the spool and the first seat member.

Further, in a case that the supply passage is provided with an oil conduit formed in the spool, whose one end communicates with the first control orifice and whose the other end communicates with the control pressure chamber, it is preferable that the one end of the oil conduit opened to the first control orifice constitutes the second control orifice when the spool comes in contact with the second seat member so as to sandwich the control pressure chamber therebetween and closes partly the first control orifice.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Preferred embodiments of the present invention are described with reference to drawings. A solenoid valve according to each of the embodiment is applicable, but not limited, to an automatic transmission for a vehicle.
(First embodiment)

Figure 1:
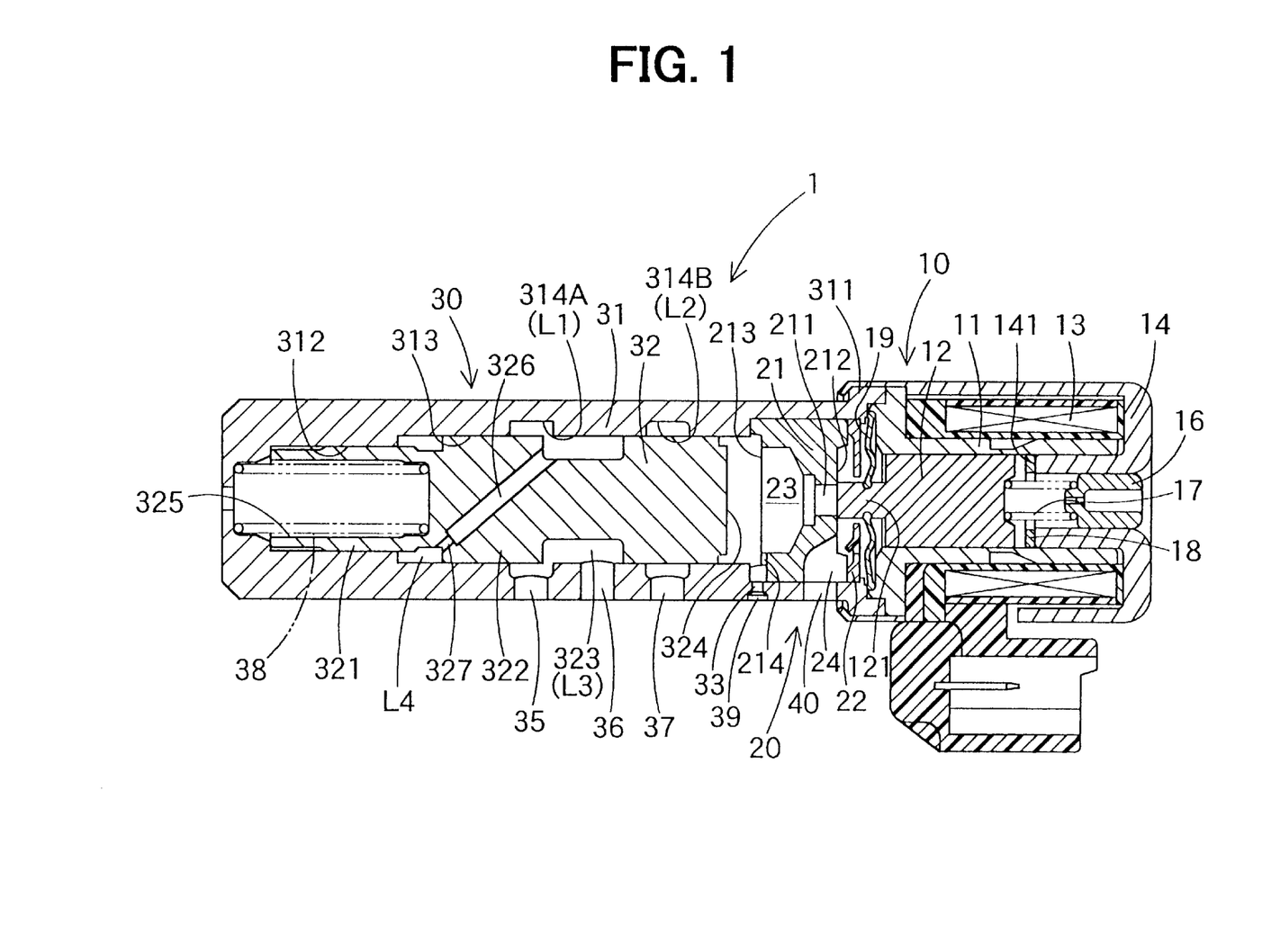
FIG. 1 is a cross sectional view of a solenoid valve according to a first embodiment of the present invention.

A solenoid valve 1 according to a first embodiment, as shown in FIG. 1, is composed of a solenoid 10 and a control valve 30. The solenoid 10 has a yoke 14, a stator core 11 and a moving core 12 slidably movable along an inner wall of the stator core 11, which form a magnetic circuit, and a coil 13 which, when energized, produces a magnetic field. The control valve 30 has a sleeve 31, a seat member 21 with which an axial end of the moving core 12 comes in contact for stopping an axial movement thereof and a spool 32 to be moved slidably by hydraulic force within the sleeve 31.

The stator core 11, whose inside have a hollow, is formed in a cylindrical shape. The moving core 12 is arranged slidably within the hollow of the stator core 11. The moving core 12 is provided at an end thereof on a side of the spool 32 with a protruding small diameter bleed valve body 121 that can contact a valve seat of the seat member 21. The coil 13 is positioned around an outer circumference of the stator core 11 and is fitted to an inner circumference of the yoke 14.

An end of an inner ring portion 141 of the yoke 14 faces an axial end of the moving core 12 opposite to the bleed valve body 121. An adjuster 16 for adjusting a preset load of a spring 17 is fitted to the inner ring portion 141.

A spacer 18, which is non-magnetic, is interposed between the stator core 11 and the moving core for preventing a contact therebetween.

The yoke 14 on a front side (left hand in FIG. 1) extends axially beyond an axial end of the stator core 11 and clings a fitting portion 311 of the sleeve 31 on a back side thereof (right hand in FIG. 1).

The seat member 21 is fitted and fixed to an inner circumference of an end of the sleeve 31 on a side of the solenoid 10 to position between a step portion of the sleeve 31 and a cover plate 22. The seat member 21 is provided at a center thereof with an axially extending bleed hole 211 through which oil passes, at an axial end thereof around the bleed hole 211 with a bleed valve seat 212 that comes in contact with the bleed valve body 121 of the moving core 12, at the other axial end thereof with a spool receiving surface 213 which comes in contact with an axial end of the spool 32 and, further, inside the spool receiving surface 213 with a recess that constitutes a bleed control pressure chamber 23.

Figure 3:
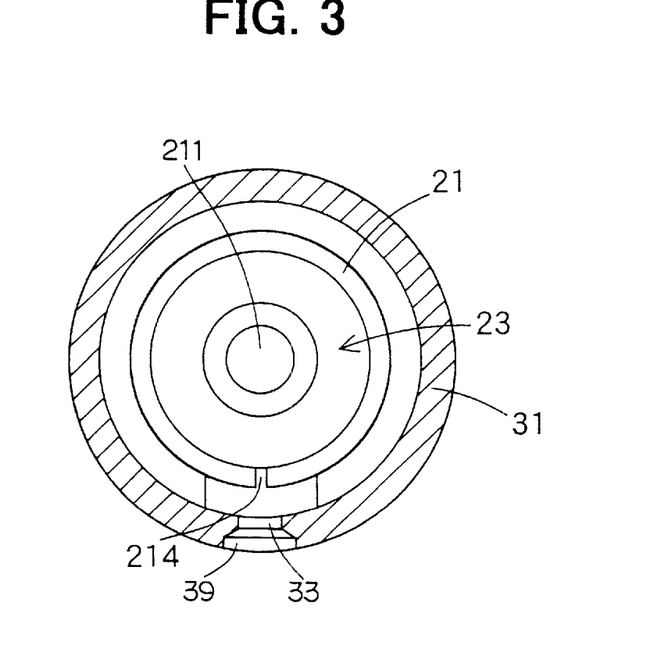
FIG. 3 is a cross sectional view taken along a line III—III of FIG. 2.
Figure 6:
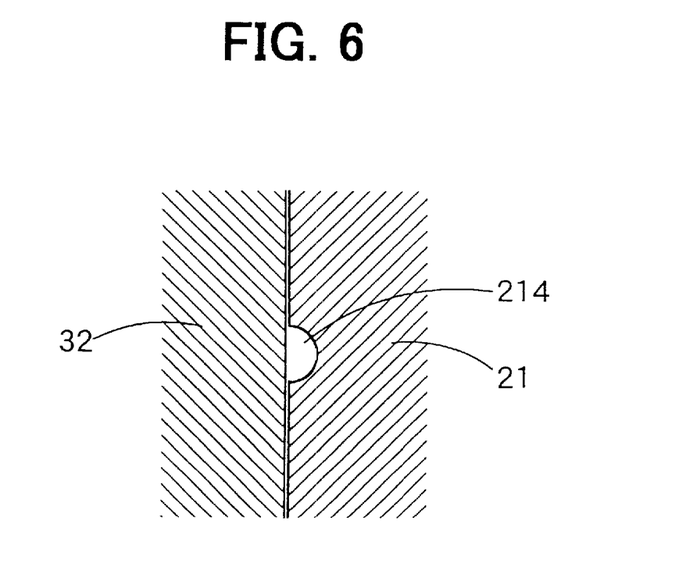
FIG. 6 is a cross sectional view taken along a line V—V of FIG. 5.

Further, as shown in FIGS. 3 and 6, the seat member 21 is provided at the axial end on a side of the spool 32 with a small diameter slit or aperture extending from an outer circumferential periphery thereof toward the bleed control pressure chamber 23, which constitutes a second orifice (second control orifice) 214 when the axial end of the spool 32 comes in contact with the spool receiving surface 213. An end of the second orifice 214 communicates with a control orifice (first control orifice) 33 that communicates with a second supply port 39 formed at an outer circumference of the sleeve 31. The seat member 21 is provided on a side of the solenoid 10 with a plurality of drain ports 24 that communicate with a second drain port 40 for ejecting oil. The second supply port 39, the control orifice 33 and the second orifice 214 constitute a supply passage. The bleed hole 211, the drain ports 24 and the second drain port 40 constitute a drain passage. The second supply port 39, the control orifice 33, the second orifice 214, the bleed control pressure chamber 23, the seat member 21, the drain ports 24 and the second drain port 40 constitute a two ports-bleed valve chamber 20 as a whole.

The spool 32, which is formed in a shape of a column having steps, is slidably accommodated in the sleeve 31 that is formed in a cylindrical shape. The sleeve 31 is provided at an inner circumference on a front end side thereof with a small inner diameter portion 312 and at an inner circumference on a base side thereof with a large inner diameter portion 313. Two ring grooves 314A and 314B are formed in the large inner diameter portion 313. The ring groove 314A communicates with a supply port 35 to which oil is supplied. The ring groove 314B communicates with a drain port 37 through which oil is ejected. An output port 36 for outputting hydraulic pressure is located between the supply port 35 and the drain port 37. The sleeve 31 is further provided at an outer circumference on the base side thereof (side of the solenoid 10) in a vicinity of the seat member 21 with the second supply port 39 communicating directly with the control orifice 33 and the second drain port 40 communicating with the drain ports 24.

A diaphragm 19 is interposed between the fitting portion 311 and the axial end of the stator 11 that contact each other. An inner circumference of the diaphragm 19 is retained by the moving core 12 and moved together therewith so that oil in the bleed control pressure chamber 23 is prevented from entering into the solenoid 10.

The spool 32 is provided with a small diameter portion 321 slidably fitted to the small inner diameter portion 312 of the sleeve 31 and a valve portion 322 slidably fitted to the large inner diameter portion 313 of the sleeve 31. A groove 323 is formed on an entire outer circumference of the valve portion 322 at a middle part thereof. The spool 32 is further provided at the axial end thereof on a side of the seat member 21 with a contact surface 324 which comes in contact with the spool receiving surface 213 and inside the small diameter portion 321 with an insertion hole 325 into which a spring 38 is inserted for urging the spool 32 toward the seat member 21.

A feedback conduit 326 extends inside the spool 32 from the groove 323 toward the small diameter portion 321. A feedback orifice 327, whose diameter is smaller than that of the feedback conduit 326, is provided in a vicinity of a portion where the feedback conduit 326 is opened to an outer circumference of the small diameter portion 321.

The ring groove 314A and the valve portion 322 constitute a first ring shaped oil chamber L1 and the ring groove 314B and the valve portion 322 constitute a second ring shaped oil chamber L2. The groove 323 and the large inner diameter portion 313 constitute a third ring shaped oil chamber L3. The large inner diameter portion 313 of the sleeve 31 and the small diameter portion 321 of the spool 32 constitute a feedback pressure chamber L4 for pressing the spool 32 to move toward the seat member 21.

An operation of the solenoid valve 1 mentioned above is describes with reference to FIGS. 1 to 6.

Figure 2:
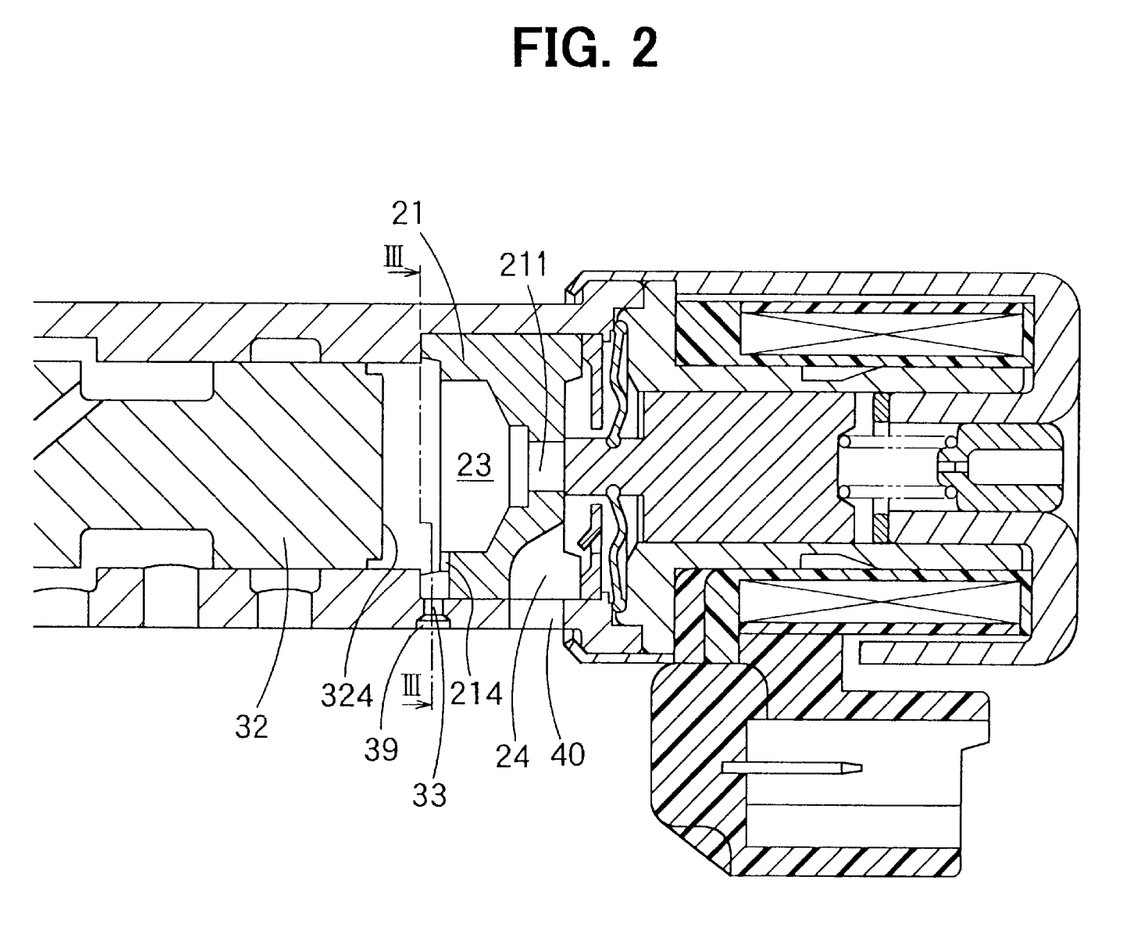
FIG. 2 is an enlarged view of a valve chamber of FIG. 1.

As shown in FIGS. 1 and 2, when the coil 13 of the solenoid 10 is not energized, the biasing force of the spring 17 urges the moving core 12 to move in a left direction in the drawings so that the bleed valve body 121 comes in contact with the bleed valve seat 212 of the seat member 21 to close the bleed hole 211. The oil supplied from a hydraulic supply source flows from the second supply port 39 via the control orifice 34 to the bleed control pressure chamber 23. The pressure of the bleed control pressure chamber 23, which is equal to a supply pressure to the second supply port 39 since the bleed hole 211 is closed and the oil entered into the bleed control pressure chamber 23 does not flow out, causes the spool 32 to move against the biasing force of the spring 38 in a left direction in FIG. 1.

When the spool 32 moves in the left hand, the groove 323, that is, the third ring shaped oil chamber L3, moves to a position where the supply port 35 communicates with the output port 36 and the communication between the output port 36 and the drain port 37 is interrupted. The spool 32 receives a force corresponding to a cross sectional area of the valve body 322 multiplied by the supply force of the bleed control pressure chamber 23, which is larger than a sum of the biasing force of the spring 38 and a force corresponding to a difference between an area of the valve body 322 and that of the small diameter portion 321 multiplied by pressure of the feedback pressure chamber L4. Accordingly, in the automatic transmission for the vehicle, for example, the oil supplied from the hydraulic supply source flows normally to a clutch thereof.

Figure 4:
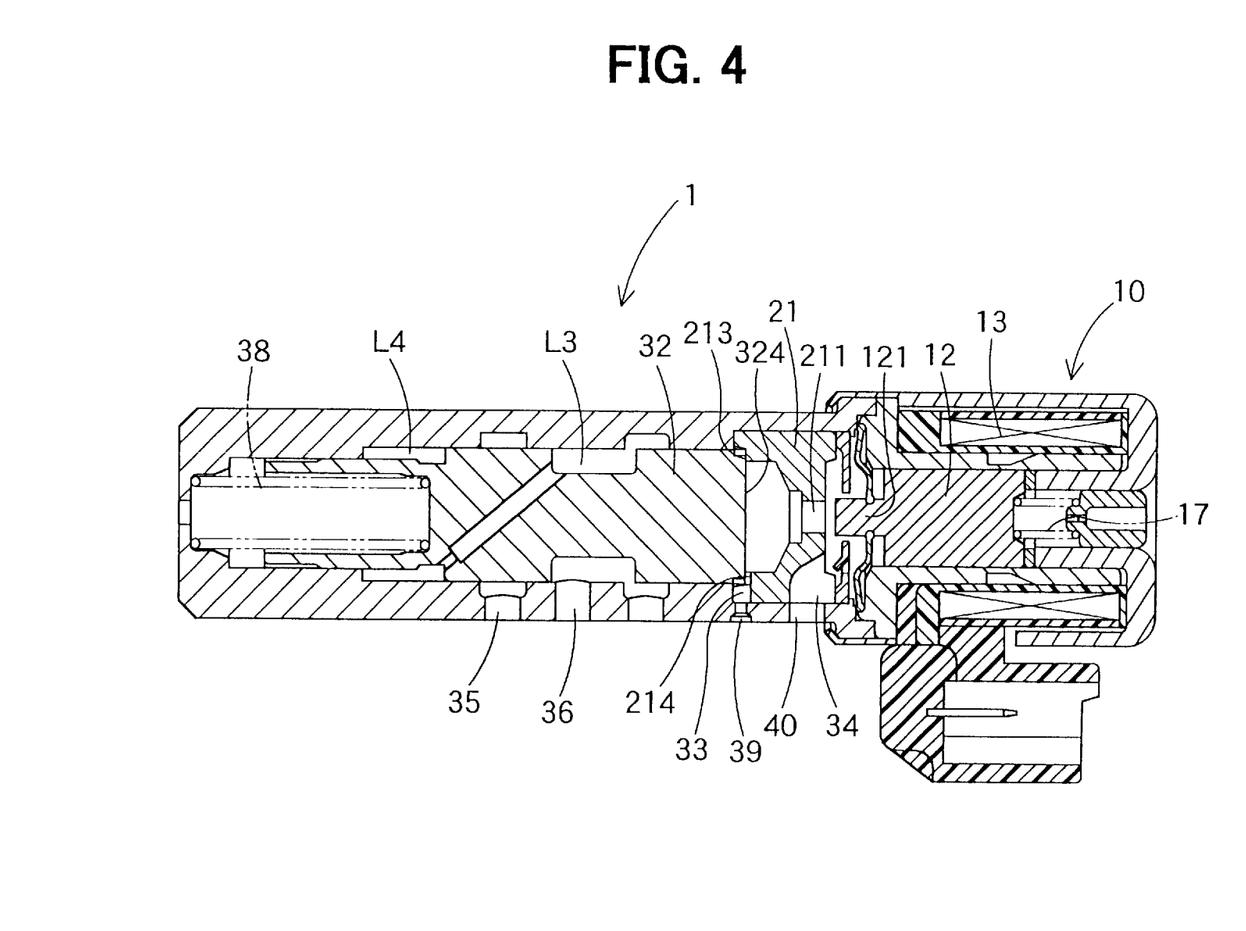
FIG. 4 is another view of the solenoid valve of FIG. 1 showing a movement of a spool.
Figure 5:
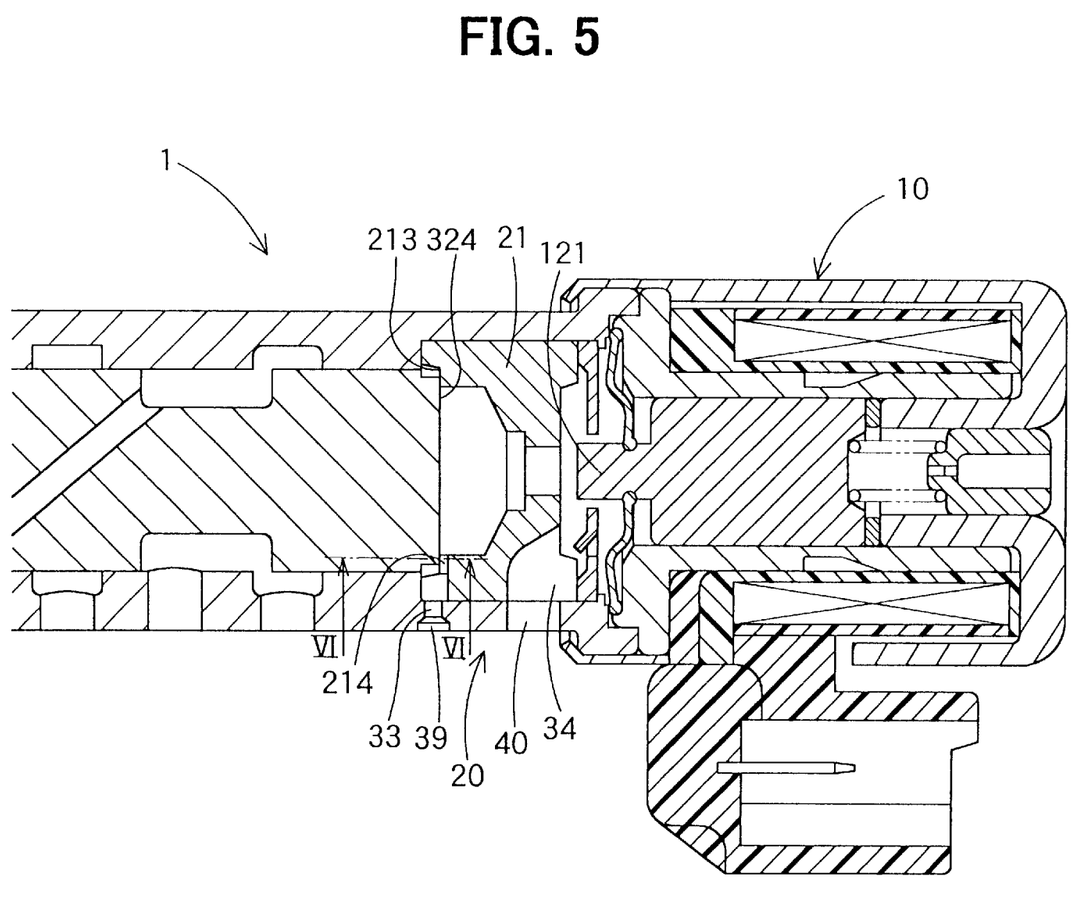
FIG. 5 is an enlarged view of a valve chamber of FIG. 4.

When the coil 13 of the solenoid 10 is energized, as shown in FIGS. 4 and 5, the moving core 12 moves against the biasing force of the spring 17 in a right direction in the drawings. The bleed valve body 121 moves in the right hand to open the bleed hole 211 so that the oil in the bleed control pressure chamber 23 is ejected via the bleed hole 211, the drain hole 24, the second drain port 40 to an outside.

As the force of pressing the spool 32 is decreased by ejecting the oil of the bleed control pressure chamber 23, the biasing force of the spring 38 and the pressure of the feedback pressure chamber L4 causes the spool 32 to move gradually in the right hand. Therefore, the third ring shaped oil chamber L3 moves to close the supply port 35 so that the communication between the supply port 35 and the output port 36 is interrupted and to open the drain port 37 so that the output port 36 communicates with the drain port 37. Accordingly, in the automatic transmission for the vehicle, for example, the oil supplied from the hydraulic supply source to the clutch is ejected.

When the contact surface 324 comes in contact with the spool receiving surface 213, the oil supplied from the second supply port 39 flows via the control orifice 33 and the second orifice 214 to the bleed control pressure chamber 23 and, then, the oil in the bleed control pressure chamber 23 is ejected via the bleed hole 211 and the drain holes 24 to the second drain port 40.

Though a flow amount of the oil passing through the control orifice 33 to be ejected from the second drain port 40 is large before the spool 32 comes in contact with the spool receiving surface 213, the flow amount of the oil to be ejected from the second drain port 40 after the spool 32 comes in contact with the spool receiving surface 213 is remarkably small since the oil passes through the second orifice 214, which is the slit (aperture) formed on the seat member 21. It is preferable that the second supply port 39 is located in a vicinity of the seat member 21 since the slit formed at the axial end of the seat member 21 constitutes the second orifice 214.

As mentioned above, the feedback conduit 326 and the feedback orifice 327 are provided inside the spool 32, an entire body of the solenoid valve 1 is compact and simple.

Instead of providing the second orifice 214 or the slit 214 at the periphery of the axial end of the seat member 21 on the side of the spool 32, the spool 32 may be provided at the axial end thereof on a side of the seat member 21 with the second orifice or slit 214.

(Second Embodiment)

Figure 7:
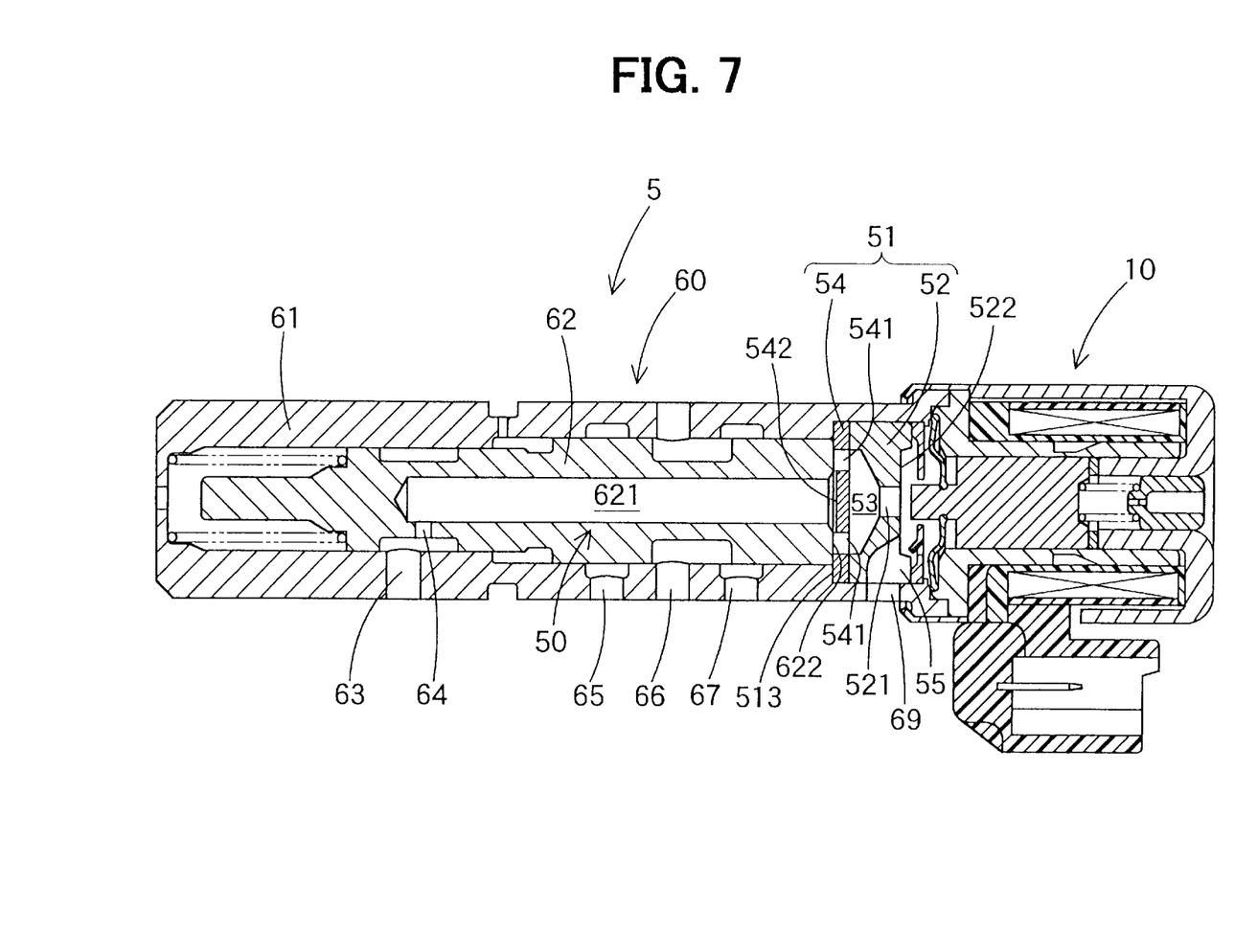
FIG. 7 is a cross sectional view of a solenoid valve according to a second embodiment of the present invention.

A solenoid valve 5 according to a second embodiment is described with reference to FIGS. 7 and 8. As shown in FIG. 7, the solenoid valve 5 has a control valve 60 in which a second supply port 63 is located far away from a seat member 51. However, a second orifice is formed in a seat member 51.

The solenoid valve 5 is composed of the solenoid 10 and the control valve 60 in which a spool 62 is slidably accommodated in a sleeve 61. A seat member 51 is interposed between the stator core 12 and the spool 62. The second supply port 63 and a control orifice 64 are located on an axial front end side of the sleeve 61 (left side in the drawing). An oil conduit 621 is provided in the spool 62 to extend from a position corresponding to the second supply port 63 to a contact surface 622 of the spool 62 that comes in contact with the seat member 51.

The seat member 51 is composed of a first seat member 52 having a bleed control pressure chamber 53 and a bleed hole 521 and a disk shaped second seat member 54 disposed between the first seat member 52 and the spool 62. The first seat member 52 is provided on a side opposite to the second seat member 54 with a plurality of drain holes 55.

Figure 8:
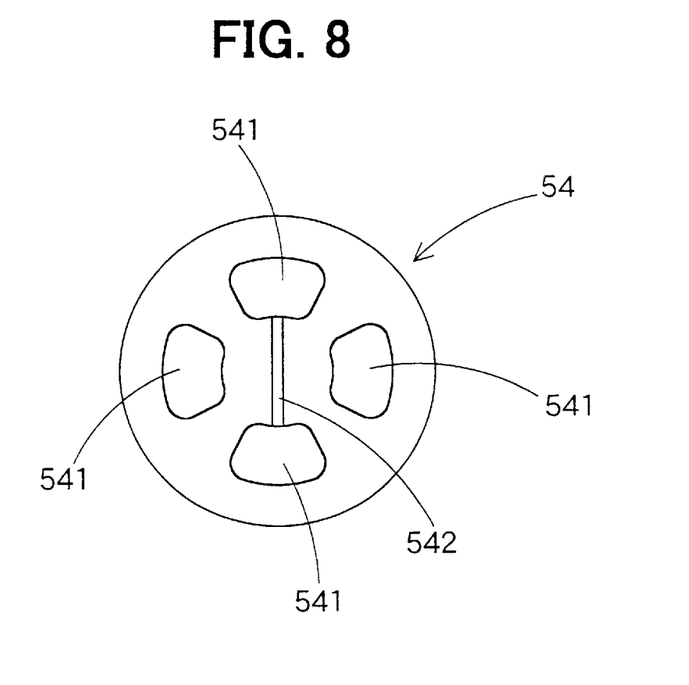
FIG. 8 is a plane view of a second seat member of FIG. 7.

As shown in FIG. 8, the second seat member 54 is provided with a plurality of oil bores 541 spaced circumferentially and penetrated axially and on a side of the spool 62 with a slit 542 connecting via a center axis thereof between two of the oil bores 541 that are arranged symmetrically to the center axis thereof. The slit 542 constitutes the second orifice 542 when the spool 62 comes in contact with an axial end of the second seat member 54. The slit 542 may be an aperture penetrating axially directly to the bleed control pressure chamber 53 without bypassing through the oil bores 541.

The oil supplied from the second supply port 63 flows via the control orifice 64, the oil conduit 621, the second orifice 542 and the oil bores 541 to the bleed control pressure chamber 53. A hydraulic circuit extending from the second supply port 63, via the control orifice 64, the oil conduit 621, the second orifice 542 and the oil bores 541, the bleed hole 521 and the drain holes 55 to a second drain port 69 constitute a two ports valve chamber 50.

The sleeve 61 of the control valve 60 is provided with a supply port 65, an output port 66 and a drain port 67, which are similar as the first embodiment. The second supply port 63 is located on an axial front end side of the supply port 65 and the second drain port 69, which communicates with the drain holes 55, is located in a vicinity of the seat member 51.

According to the solenoid valve 5 mentioned above, when the solenoid 10 is not energized, the valve bleed body 121 is in contact with a bleed valve seat 522 of the first seat member 52 to close the bleed hole 521. Accordingly, the oil supplied from the hydraulic supply source to the second supply port 63 is flowed via the control orifice 64 and the oil bores 541 to the bleed control pressure chamber 63 so that the spool 62 moves in a left direction. The spool 62 is in a position that the supply port 65 communicates with the output port 66 and the communication between the output port 66 and the drain port 67 is interrupted.

When the coil 13 of the solenoid 10 is energized, the moving core 12 moves in a right direction so that the bleed hole 521 is opened. Accordingly, the oil in the bleed control pressure chamber 63 is ejected via the bleed hole 521, the drain holes 55 and the second drain port 69 to an outside.

Further, the spool 62 gradually moves in a right direction to close the supply port 65 so that the communication between the supply port 65 and the output port 66 is interrupted and to open the drain port 67 so that the output port 66 communicates with the drain port 67.

When the contact surface 622 comes in contact with a spool receiving surface 513 of the second seat member 54, the oil supplied from the second supply port 63 flows via the control orifice 65, the oil conduit 621 and the second orifice 542 to the bleed control pressure chamber 53 and, then, the oil in the bleed control pressure chamber 53 is ejected via the bleed hole 521 of the first seat member 52 and the drain holes 55 to the second drain port 69.

Though a flow amount of the oil passing through the control orifice 64 to be ejected from the second drain port 69 is large before the spool 62 comes in contact with the spool receiving surface 513, the flow amount of the oil passing through the second orifice 542, which is the slit formed on the second seat member 54, to be ejected from the second drain port 69 after the spool 62 comes in contact with the spool receiving surface 513 is remarkably small, which is similar to the first embodiment.

(Third Embodiment)

A solenoid valve 7 according to a third embodiment is described with reference to FIGS. 9 to 12. The solenoid valve 7 has a control valve 80 in which a second supply port 83 is located in a vicinity of a seat member 71, which is similar to the first embodiment.

Figure 9:
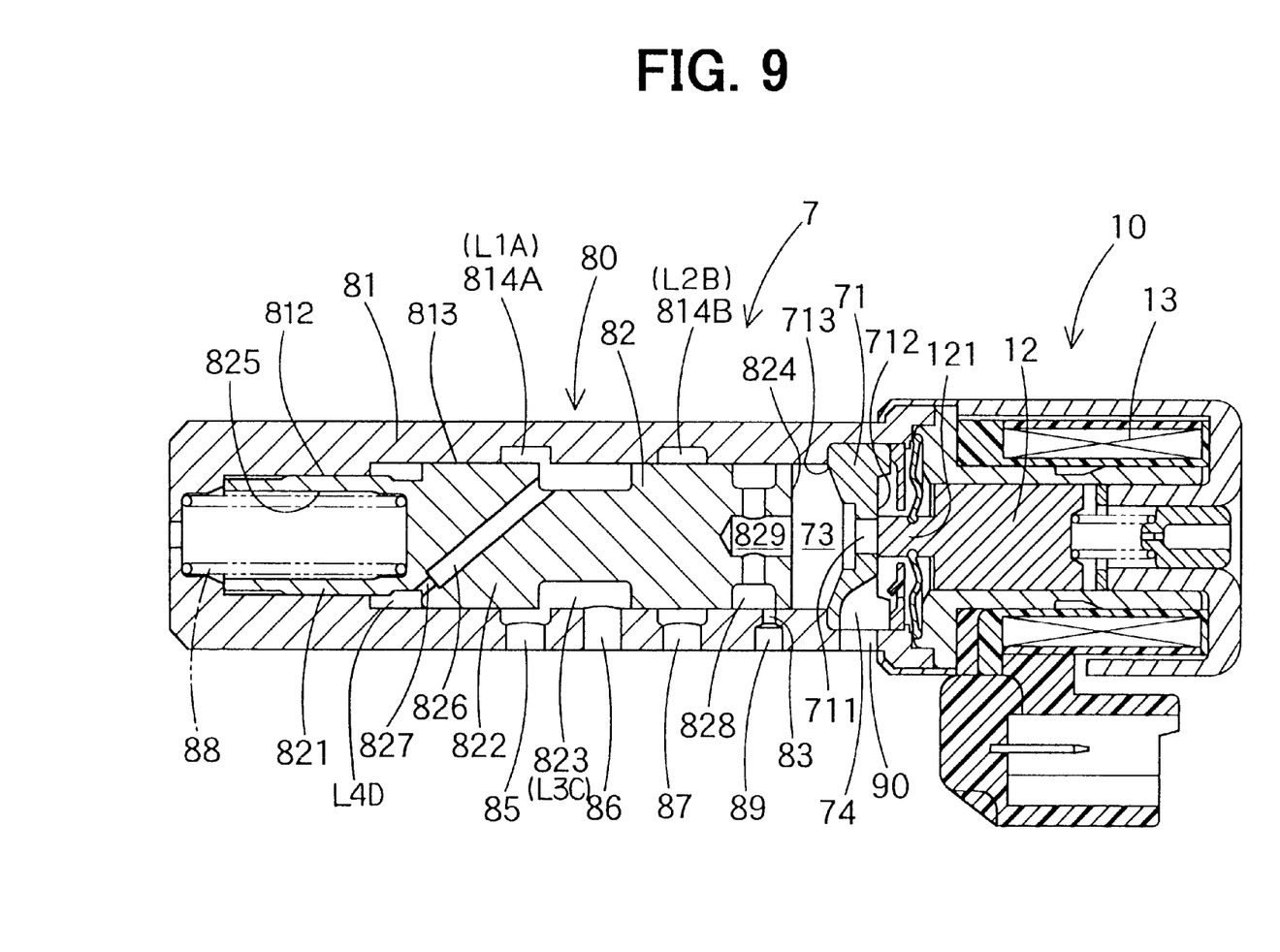
FIG. 9 is a cross sectional view of a solenoid valve according to a third embodiment of the present invention.

The solenoid valve 7 is composed of the solenoid 10 and the control valve 80 in which a spool 82 is slidably accommodated in a sleeve 81. A seat member 71 is interposed between the stator core 12 and the spool 82. The seat member 71 is provided at a center thereof with an axially extending bleed hole 711 through which oil communicates, at an axial end thereof around the bleed hole 711 with a bleed valve seat 712 that comes in contact with the bleed valve body 121 of the moving core 12, at the other axial end thereof with a spool receiving surface 713 which comes in contact with an axial end of the spool 82 and, further, inside the spool receiving surface 713 with a recess that constitutes a bleed control pressure chamber 73. Further, the seat member 71 is provided at a periphery thereof on a side of the seat member with a plurality of drain ports 74.

The spool 82, which is formed in a shape of a column having steps, is slidably accommodated in the sleeve 81 that is formed in a cylindrical shape. The sleeve 81 is provided at an inner circumference on a front end side thereof with a small inner diameter portion 812 and at an inner circumference on a base side thereof with a large inner diameter portion 813. Two ring grooves 814A and 814B are formed in the large inner diameter portion 813. The ring groove 814A communicates with a supply port 85 to which oil is supplied. The ring groove 814B communicates with a drain port 87 through which oil is ejected. An output port 86 for outputting hydraulic pressure is located between the supply port 85 and the drain port 87. The sleeve 81 is further provided at an outer circumference on the base side thereof (side of the solenoid 10) in a vicinity of the seat member 71 with a second supply port 89 communicating directly with a control orifice 83 whose diameter is smaller than that of the second supply port 89 and a second drain port 90 communicating with the drain ports 74.

The spool 82 is provided with a small diameter portion 821 slidably fitted to the small inner diameter portion 812 of the sleeve 81 and a valve portion 822 slidably fitted to the large inner diameter portion 813 of the sleeve 81. A groove 823 is formed on an entire outer circumference of the valve portion 822 at a middle part thereof. The spool 82 is further provided at the axial end on a side of the seat member 71 with a contact surface 824 which comes in contact with a spool receiving surface 713 and inside the small diameter portion 821 with an insertion hole 825 into which a spring 88 is inserted for urging the spool 82 toward the seat member 71.

A feedback conduit 826 extends inside the spool 82 from the groove 823 toward the small diameter portion 821. A feedback orifice 827, whose diameter is smaller than that of the feedback conduit 826, is provided in a vicinity of a portion where the feedback conduit 826 is opened to an outer circumference of the small diameter portion 821. The feedback conduit 826 and the feedback orifice 827 are operative similarly as those of the first embodiment.

Figure 10:
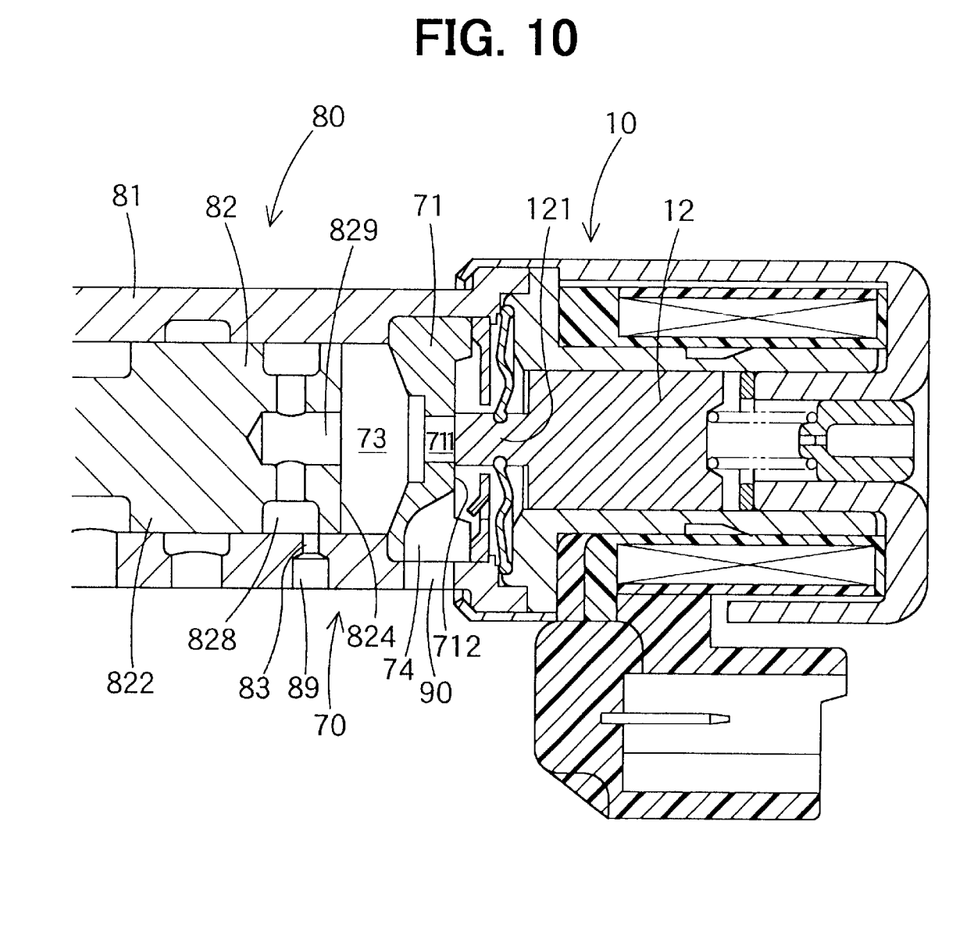
FIG. 10 is an enlarged view of a valve chamber of FIG. 9.
Figure 12:
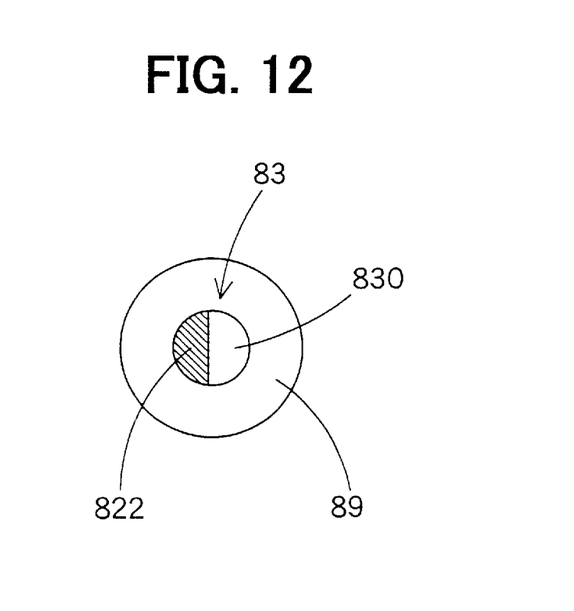
FIG. 12 is a part view as viewed from an arrow XII Of FIG. 11.

As shown in FIG. 10, the large diameter portion 822 of the spool 82 is provided at an outer circumference in a vicinity of the contact surface 824 with a ring shaped oil chamber 828 that communicates with an oil conduit 829 extending axially from the contact surface 824. As shown in FIG. 12, when the valve portion 822 moves axially, an outlet of the control orifice 83 opened to the groove 828 constitutes a second orifice 830. A hydraulic circuit from the second supply port 89, via the control orifice 83, the bleed control pressure chamber 73 and the bleed hole 711, to the second drain port 90 constitute a two ports valve chamber 70.

The ring groove 814A and the valve portion 822 constitute a first ring shaped oil chamber L1A and the ring groove 814B and the valve portion 822 constitute a second ring shaped oil chamber L2B. The groove 823 and the large diameter portion 813 constitute a third ring shaped oil chamber L3C. The large diameter portion 813 of the spool 81 and the small diameter portion 821 of the spool 32 constitute a feedback pressure chamber L4D for pressing the spool 82 to move toward the seat member 71.

An operation of the solenoid valve 7 mentioned above is describes with reference to FIGS. 9 to 12.

As shown in FIG. 10, when the coil 13 of the solenoid 10 is not energized, the bleed valve body 121 of the moving core 12 comes in contact with the bleed valve seat 712 of the seat member 71 to close the bleed hole 711. The oil supplied from a hydraulic supply source flows from the second supply port 89 via the control orifice 83, the ring shaped oil chamber 828 and the oil conduit 829 to the bleed control pressure chamber 73. Accordingly, the spool 82 moves in a left direction in FIG. 10.

When the spool 82 moves in the left hand, the third ring shaped oil chamber L3C moves to a position where the supply port 85 communicates with the output port 86 and the communication between the output port 86 and the drain port 87 is interrupted.

Figure 11:
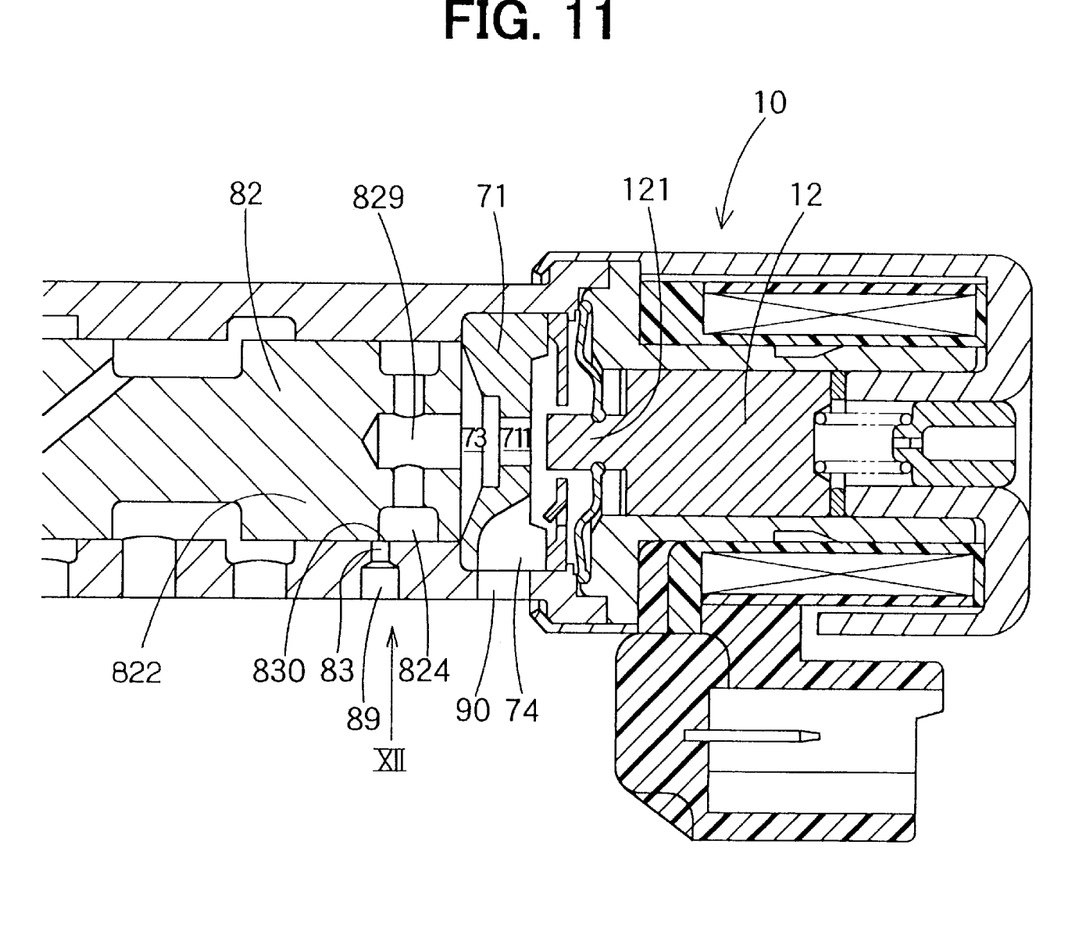
FIG. 11 is another view of the solenoid valve of FIG. 9 showing a movement of a spool.

When the coil 13 of the solenoid 10 is energized, as shown in FIG. 11, the moving core 12 moves in a right direction in the drawing. The bleed valve body 121 moves in the right hand to open the bleed hole 711 so that the oil in the bleed control pressure chamber 73 is ejected via the bleed hole 711, the drain holes 74, the second drain port 90 to an outside.

As the spool 82 moves gradually in the right hand, the third ring shaped oil chamber L3C moves to close the supply port 85 so that the communication between the supply port 85 and the output port 86 is interrupted and to open the drain port 87 so that the output port 86 communicates with the drain port 87.

When the contact surface 824 comes in contact with the spool receiving surface 713, the control orifice is partly closed. A portion of the control orifice partly opened to the ring shaped oil chamber 828 forms the second orifice 830 (refer to FIG. 12). Accordingly, the oil supplied from the second supply port 89 flows via the control orifice 83 and the second orifice 830 to the bleed control pressure chamber 73 and, then, the oil in the bleed control pressure chamber 73 is ejected via the bleed hole 711 and the drain holes 74 to the second drain port 90.

As mentioned above, when the bleed hole 711 is closed upon operation (no energization) of the solenoid 10, the bleed control pressure chamber 73 is filled with the oil supplied from the control orifice 83 so that the spool 82 moves.

When the bleed hole 711 is opened upon energizing the coil 13 of the solenoid 10, the oil in the bleed control pressure chamber 73 is gradually ejected to the second drain port 74. At this time, the spool 82 moves toward the seat member to close gradually the control orifice 71. When the spool 82 comes in contact with seat member 71, the valve portion 822 closes a part of the control orifice 83 so that the other part of the control orifice 83, whose opening area is small, is the second orifice 830.

Therefore, though a flow amount of the oil passing through the control orifice 38 to be ejected from the second drain port 90 is large before the spool 82 comes in contact with the seat member 71, the flow amount of the oil to be ejected from the second drain port 90 after the spool 82 comes in contact with the seat member 71 is remarkably small since the oil passes through the second orifice 830, which cross sectional opening area is small. The solenoid valve 80 according to the third embodiment is not costly since the second orifice 830 is not provided in the seat member 71.

What is claimed is:
1. A solenoid valve comprising:
   a hollow sleeve being provided at a circumferential wall thereof with a first supply port, an output port, a first drain port, a second supply port and a second drain port, the second supply port being provided with a first control orifice;
   a spool slidably moving in the hollow sleeve;
   a seat member fixed to the hollow sleeve and having an oil hole;
   a control pressure chamber formed in the hollow sleeve between the seat member and the spool, an end of the oil hole communicating with the control pressure chamber;
   a supply passage through which the second supply port communicates via the first control orifice with the control pressure chamber;
   a drain passage through which the other end of the oil hole is able to communicate with the second drain port;
   a solenoid having an armature core movable according to an electromagnetic attracting force, the spool being moved in a direction away from the seat member by pressure increase of the control pressure chamber due to oil supplied thereto via the supply passage, when the armature core is in contact with the seat member and closes the other end of the oil hole, and being moved toward the seat member by pressure decrease of the control pressure chamber due to the oil ejected therefrom via the drain passage, when the armature core is away from the seat member and opens the other end of the oil hole, so that one of a communication between the first supply port and the output port and a communication between the output port and the first drain port is selected; and
   a second control orifice, whose cross sectional opening area is smaller than that of the first control orifice, formed in the supply passage when an end of the spool comes in contact with an end of the seat member so that a flow amount of the oil supplied to and ejected from the control pressure chamber through the supply and drain passages after the spool contacts the seat member is smaller than that before the spool contacts the seat member.

2. A solenoid valve according to claim 1, wherein the second control orifice is a slit formed at a periphery of at least one of the end of the seat member and the end of the spool that come in contact with each other so as to sandwich the control pressure chamber therebetween so that one end of the slit communicates with the control pressure chamber and the other end thereof communicates with the first control orifice.

3. A solenoid valve according to claim 1, further comprising:
   a groove formed on an entire outer circumference of the spool for allowing the one of the communication between the first supply port and the output port and the communication between the output port and the first drain port according to the movement of the spool in the hollow sleeve;
   a feedback pressure chamber formed between the hollow sleeve and the spool;
   a feedback conduit extending inside the spool from the groove toward the feedback pressure chamber; and
   a feedback orifice formed in a vicinity of a position where the feedback conduit is opened to the feedback pressure chamber, wherein the feedback pressure chamber receives pressure acting in a direction of moving the spool toward the seat member due to oil supplied thereto from the first supply port via the groove, the feedback conduit and the feedback orifice when the first supply port communicates with the output port.

4. A solenoid valve according to claim 1, wherein the supply passage includes an oil conduit formed in the spool, whose one end communicates with the first control orifice and whose the other end communicates with the control pressure chamber and, further, wherein the seat member comprises a first seat member, positioned on a side of the solenoid, having the oil hole and a second seat member, positioned on a side of the spool, protruding into the control pressure chamber and having a slit constituting the second control orifice through which the other end of the oil conduit is opened to the control pressure chamber, when the spool comes in contact with the second seat member so as to sandwich the control pressure chamber between the spool and the first seat member.

5. A solenoid valve according to claim 1, wherein the supply passage includes an oil conduit formed in the spool, whose one end communicates with the first control orifice and whose the other end communicates with the control pressure chamber, the one end of the oil conduit opened to the first control orifice constituting the second control orifice when the spool comes in contact with the second seat member so as to sandwich the control pressure chamber therebetween and closes partly the first control orifice.

* * * * *